Figure 1:
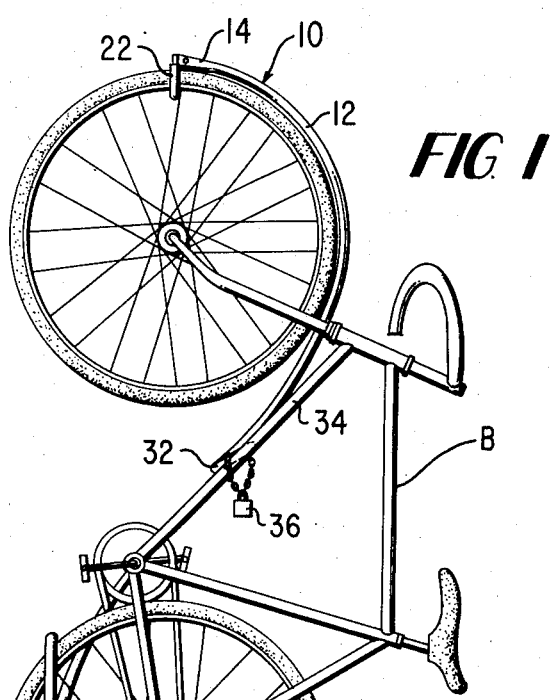

United States Patent [19]

Hoenig

[11] 3,828,936
[45] Aug. 13, 1974

[54] BICYCLE HANGER

[76] Inventor: Karl Blake Hoenig, 4582 MacArthur Blvd., Washington, D.C. 20007

[22] Filed: Feb. 27, 1973

[21] Appl. No.: 336,337

[52] U.S. Cl. .................................................. 211/19
[51] Int. Cl. ............................................. A47f 7/00
[58] Field of Search .............. 211/5, 17, 18, 19, 20, 211/21, 22; 70/233, 234, 235

[56] References Cited
UNITED STATES PATENTS

| 586,681 | 7/1897 | Douglas | 211/19 |
| 588,542 | 8/1897 | Williams | 211/17 |
| 608,393 | 8/1898 | Jackson et al. | 211/17 |
| 621,819 | 3/1899 | Ivatt | 211/17 |
| 672,070 | 4/1901 | Smith | 211/19 |

FOREIGN PATENTS OR APPLICATIONS

| 659,148 | 2/1965 | Belgium | 211/20 |
| 22,802 | 8/1898 | Great Britain | 211/21 |
| 466,850 | 9/1928 | Germany | 211/17 |
| 12,927 | 8/1896 | Great Britain | 211/18 |
| 155,887 | 4/1939 | Germany | 211/17 |

*Primary Examiner*—Ramon S. Britts
*Assistant Examiner*—Thomas J. Holko
*Attorney, Agent, or Firm*—Donald D. Jeffery

[57] ABSTRACT

A bicycle hanger comprising a main body portion provided with means adjacent the opposite ends thereof for mounting the hanger on a supporting surface. A wheel hanging member extends laterally from the top of the main body portion and is formed to receive and support a rim of the bicycle. A cradle member extends laterally from the opposite end of the main body portion to receive and support the other wheel of the bicycle when the bicycle is suspended from the hanger. The main body portion is generally semi-circular in its upper region to provide lateral stability, and the main body portion extends throughout its length in contiguous engagement with the supporting surface thereby to provide vertical stability.

8 Claims, 3 Drawing Figures

PATENTED AUG 13 1974 3,828,936

3,828,936

BICYCLE HANGER

BACKGROUND OF THE INVENTION

The present invention relates as indicated to a bicycle hanger, and more particularly to a hanger which can be mounted on a wall and the bicycle suspended therefrom in a vertical position.

Bicycle hangers of the general type here concerned have long been used for supporting bicycles from the walls and ceilings of enclosures, primarily as a means for conserving floor space in the enclosure. Floor space in common carriers such as railroad cars and the like is particularly important, and U.S. Pat. Nos. 588,542; 621,819 and 1,232,501 are specifically directed to bicycle racks or supports for hanging bikes from the walls or ceilings of railroad cars or like vehicles. U.S. Pat. Nos. 590,773; 615,264 and 672,070 are also directed to holders or racks for supporting bicycles vertically from a supporting surface.

Although the prior art referred to above is generally satisfactory for the use intended, certain disadvantages do exist. Most of the support assemblies include at least two parts, thereby requiring that the parts be carefully located and aligned on the surfaces supporting the same so that the bicycle can be supported or hung therefrom. In one such instance, the support includes members mounted on both the ceiling and the wall, which further complicates the installation of the assembly. In certain instances, the assemblies are relatively complex in structure and relatively difficult to mount, thereby resulting in comparatively high acquisition and installation costs. Instability either of the hanger itself or the bicycle when suspended therefrom has also been a disadvantage in prior art hangers.

SUMMARY OF THE INVENTION

With the above in mind, a primary object of the present invention is to provide a simple, one-piece bicycle hanger which can be quickly and easily mounted on a vertical supporting surface and from which the bicycle can be vertically hung.

A further object of the invention is to provide such a hanger which is relatively stable by virtue of the configuration thereof. In accordance with the invention, the hanger includes a main body portion which is curved in the upper region thereof to generally conform with the shape of the rim of one wheel of the bike and a frame member, with the main body portion being flush against the supporting surface when the bicycle hanger is mounted thereon. The lower region of the main body portion is laterally offset from the upper region thereby providing lateral stability to the hanger and preventing canting or wobbling of the hanger when a bicycle is suspended therefrom. Means for suspending the bicycle extend outwardly from the main body portion of the hanger adjacent the top and bottom portions thereof whereby the bicycle is vertically suspended in a plane generally parallel to the supporting surface. In this manner, the sprocket and gear train are not exposed at the front of the hanger thereby preventing damage to these parts when the bicycle is suspended.

A still further object of the present invention is to provide a bicycle hanger provided with means to facilitate locking of the suspended bicycle to the hanger, thereby to preclude unauthorized removal of the bicycle from the hanger.

A still further object of the present invention is to provide a bicycle hanger which can be manufactured at relatively low cost and which can be quickly mounted on the supporting surface, or removed therefrom and relocated if desired.

These and other objects of the invention will become apparent as the following description proceeds in particular reference to the application drawing.

BRIEF DESCRIPTION OF THE APPLICATION DRAWING

Figure 2:
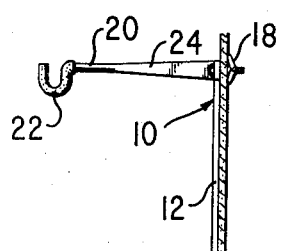
Figure 3:
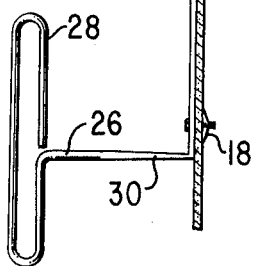

In the application drawing, FIG. 1 comprises a front elevational view of the bicycle hanger in accordance with the invention, with a bicycle being shown supported by the hanger;

FIG. 2 is a side elevational view of the hanger by itself, illustrating a typical installation of the hanger on a vertical supporting surface, and FIG. 3 is a front elevational view of the hanger by itself.

BRIEF DESCRIPTION OF THE PREFERRED EMBODIMENT

Referring now to the application drawing, the bicycle hanger constructed in accordance with the present invention is generally indicated at 10 and comprises a main body portion 12 having a curvature as shown in FIG. 3. The upper section of the main body 12 is generally semi-circular in form, having a radius comparable to the radius of the wheel of a bicycle to be supported by the hanger. A bicycle indicated at B is shown supported from the hanger in FIG. 1.

The main body portion in the form shown is tubular, and can be constructed of any suitable material, such as steel or aluminum tubing. The diameter of the tubing can be selected as desired so as to provide the necessary strength and stability to the hanger. Although metal tubing is highly satisfactory, it will be understood that other materials, including plastics, could be employed, with the invention not being in any way dependent upon the material used.

The main body 12 is flattened at the upper and lower ends thereof as indicated at 14 and 16, respectively, to facilitate mounting of the hanger on the vertical supporting surface. Holes are drilled in the flattened sections 14 and 16, and suitable fastening means extend through such holes for firmly attaching the hanger to the wall, which is indicated at W in FIG. 2. In the form shown, the fastener comprises a toggle bolt 18, although it will be understood that where the supporting wall is solid, other type fasteners could alternatively be used. Integrally formed with the main body 12 and extending perpendicular from the plane of the main body at the top thereof is a bracket-like front wheel supporting portion 20 the outer end of which is shaped as shown to provide a hook 22 for receiving and supporting the rim of one wheel of the bicycle in the manner shown in FIG. 1. In order to prevent scratching of the bicycle rim, the hook portion can be provided with an abrasive resistant cover as shown. In order to strengthen the supporting portion 20 of the hanger, the same is preferably flattened as indicated at 24.

Extending laterally from the main body portion at the bottom thereof is a cradle section 26 the end of which is formed to provide a loop 28 having a width slightly greater than the width of the rim and wheel of the bicycle so as to receive the wheel therethrough as shown in FIG. 1. The length of the loop 28 is substantially less than the diameter of the wheel so that the wheel is retained by the cradle 28 when the bicycle is suspended as shown. In order to rigidify the cradle section, the same is preferably flattened as shown at 30.

A loop 32 is formed in the main body portion 12 generally intermediate the length thereof, which loop is adapted to be positioned adjacent the frame member 34 of the bicycle when the same is suspended from the hanger, as shown in FIG. 1. The bicycle can therefore be locked in its hung position by inserting the lock through the loop 32 and around the frame member 34, as shown. It will be noted that the intermediate section of the main body portion extends generally in the same direction as the frame member 34 of the bicycle.

Referring to FIG. 2, it will be noted that the hook 22 and the loop 28 are in generally the same vertical plane, so that the bicycle, when suspended, is spaced from the wall 12. It will further be noted that sprocket and gear train are disposed facing the supporting surface so as to minimize inadvertent contact with and possible damage to the gears when the bicycle is suspended. The only parts of the bicycle exposed outwardly from the hanger are one of the petals and a part of the handle bar, with the latter being sufficiently elevated so as to be essentially out of the way. The minimum exposure of parts when the bicycle is suspended also prevents injury to persons passing in front of the bicycle.

The loop 28 of the cradle is laterally offset from the hook 22, referring to FIG. 3, whereby the bicycle when hung is suspended substantially vertically. The offsetting of the top and bottom of the hanger also provides, as above mentioned, lateral stability to the hanger.

To suspend the bicycle from the hanger 12, the bicycle is positioned generally vertically and the rim of the front wheel is dropped into the loop 22. When so supported, the bicycle can be released and the other wheel will swing by gravity into the loop 28 of the cradle which maintains the bottom of the bicycle in a stable and aligned condition. After hanging the bicycle, the same may be locked as described. To remove the bicycle from the hanger, the rear wheel is withdrawn from the loop 28 and the bicycle lifted to disengage the rim of the front wheel of the bicycle from the loop 22. Although the bicycle has been shown suspended with the front wheel uppermost, it will be apparent that the bicycle could be suspended with the rear wheel uppermost.

It will thus be seen that the hanger constructed in accordance with the present invention is simple in construction and thus economical to manufacture. The hanger can be quickly mounted on a supporting surface, and the main body portion, due both to its configuration and the fact that it is at all times flush with the supporting surface, provides a high degree of lateral and vertical stability to the hanger. The weight of the bicycle is primarily on the wheel hanging portion 20, which is transferred to the main body portion which is integral therewith. In this manner, the weight is effectively transferred to the wall W against which the main body portion is in contiguous engagement.

It will be recognized by those skilled in the art that the invention can also be practiced by the use of bar stock rather than the illustrated tubing. For example, a one-half inch or similar diameter metal rod or bar can be employed, with the rod being bent in generally the same configuration as the tubing shown in FIGS. 1–3. For the purpose of mounting the rod hanger, holes may be drilled through the main body portion of the rod adjacent the top and bottom thereof, or, alternatively, brackets may be welded or otherwise secured to the rod hanger for mounting the same on a supporting surface. It will also be understood that the lock loop 32 can be eliminated or provided separately and secured to the hanger by welding or the like. The construction of the rod hanger can be otherwise the same, with the principal features and advantage of the invention applying as well to such modified form.

Minor variations from the above description will be apparent to those skilled in the art, without, however, departing from the spirit of the invention as defined in the appended claims.

I claim:

1. A bicycle hanger adapted to be mounted on a vertical supporting surface for removably supporting a bicycle in a generally vertical position comprising:
   a. a main body portion provided with means for mounting said hanger on said surface, said main body portion being contiguous with said surface when so mounted,
   b. a wheel hanging member extending outwardly perpendicular to said main body portion at one end thereof, the outer end of said wheel hanging member being formed to receive and support the rim of one wheel of the bicycle, and
   c. a cradle member extending outwardly perpendicular to said main body portion at the opposite end thereof, said cradle member comprising a vertically oriented member having an elongated, open slot having a width to receive the rim of the other wheel of the bicycle and a length less than the diameter of said rim so that said other wheel extends partially through said member, said elongated open slot of said cradle member and said outer end of said wheel hanging member being in a vertical plane horizontally offset from the plane of said main body portion and parallel thereto, thereby maintaining the bicycle in a stable, vertical position in said vertical plane parallel to said main body portion.

2. The bicycle hanger of claim 1 wherein said main body portion includes upper, intermediate and lower sections, said upper section being generally semi-circular having a radius corresponding generally to the radius of a bicycle wheel, said intermediate and lower sections extending downwardly from said upper section in a direction generally parallel to the frame of the bicycle.

3. The bicycle hanger of claim 2 wherein said intermediate section of said main body portion is provided with a loop for locking the bicycle when suspended from the bicycle hanger.

4. The bicycle hanger of claim 1 wherein said wheel hanging member includes a covering on the outer end thereof to prevent scratching of the bicycle rim when the bicycle is suspended from the hanger.

5. The bicycle hanger of claim 1 wherein said hanger is constructed from tubular material.

6. The bicycle hanger of claim 1 wherein said hanger is constructed of rod material.

7. The bicycle hanger of claim 1 wherein said wheel hanging member and said cradle member are formed with flattened portions in the regions thereof adjacent said main body portion thereby to enhance the stability of the hanger in these regions, and said main body portion is provided with flattened portions adjacent the opposite ends thereof to facilitate mounting of said hanger on said supporting surface.

8. A bicycle hanger adapted to be mounted on a vertical supporting surface for removably supporting a bicycle in a generally vertical position comprising:
  a. a main body portion provided with means for mounting said hanger on said surface, said main body portion being contiguous with said surface when so mounted,
  b. a wheel hanging member extending outwardly perpendicular to said main body portion at one end thereof, the outer end of said wheel hanging member being formed to receive and support the rim of one wheel of the bicycle, and
  c. a cradle member extending outwardly perpendicular to said main body portion at the opposite end thereof, said cradle member having an elongated, open slot having a width to receive the rim of the other wheel of the bicycle and a length less than the diameter of said rim so that said other wheel extends partially through said member, said elongated open slot of said cradle member and said outer end of said wheel hanging member being in a vertical plane horizontally offset from the plane of said main body portion and parallel thereto, thereby maintaining the bicycle in a stable, vertical position in said vertical plane parallel to said main body portion.

* * * * *